(12) United States Patent
Kamen et al.

(10) Patent No.: US 10,227,098 B2
(45) Date of Patent: Mar. 12, 2019

(54) CONTROL OF A TRANSPORTER BASED ON ATTITUDE

(71) Applicant: DEKA Products Limited Partnership, Manchester, NH (US)

(72) Inventors: Dean Kamen, Bedford, NH (US); Richard Kurt Heinzmann, Francestown, NH (US); Robert R. Ambrogi, Manchester, NH (US)

(73) Assignee: DEKA PRODUCTS LIMITED PARTNERSHIP, Manchester, NH (US)

( * ) Notice: Subject to any disclaimer, the term of this patent is extended or adjusted under 35 U.S.C. 154(b) by 12 days.

(21) Appl. No.: 15/150,723

(22) Filed: May 10, 2016

(65) Prior Publication Data

US 2016/0264195 A1    Sep. 15, 2016

Related U.S. Application Data

(60) Division of application No. 14/589,116, filed on Jan. 5, 2015, now Pat. No. 9,545,963, which is a
(Continued)

(51) Int. Cl.
*B60D 1/00* (2006.01)
*B62D 51/00* (2006.01)
(Continued)

(52) U.S. Cl.
CPC ............ *B62D 51/001* (2013.01); *B60G 11/14* (2013.01); *B60G 17/019* (2013.01); *B60K 26/02* (2013.01);
(Continued)

(58) Field of Classification Search
CPC ............................ B62D 51/001; B62K 11/007
(Continued)

(56) References Cited

U.S. PATENT DOCUMENTS

| 880,823 A | 3/1908 | Redfield |
| 2,224,411 A | 12/1940 | Smith |

(Continued)

FOREIGN PATENT DOCUMENTS

| CA | 2 580 632 A1 | 3/2006 |
| CA | 2 822 729 A1 | 3/2006 |

(Continued)

OTHER PUBLICATIONS

031416, Plaintiffs' Opening Brief in Support of Combined Motion to Strike Defendant's Fifth and Sixth Affirmative Defenses and Motion to Dismiss Defendant's Counterclaims, ITC investigation #337-TA-935, Mar. 14, 2016.*

(Continued)

*Primary Examiner* — Tony H Winner
(74) *Attorney, Agent, or Firm* — McCormick, Paulding & Huber LLP

(57) ABSTRACT

A transporter for transporting a load over a surface. The transporter includes a support platform for supporting the load. The support platform is characterized by a fore-aft axis, a lateral axis, and an orientation with respect to the surface, the orientation referred to as an attitude. At least one ground-contacting element is flexibly coupled to the support platform in such a manner that the attitude of the support platform is capable of variation. One or more ground-contacting elements are driven by a motorized drive arrangement. A sensor module generates a signal characterizing the attitude of the support platform. Based on the attitude, a controller commands the motorized drive arrangement.

18 Claims, 4 Drawing Sheets

Related U.S. Application Data continuation of application No. 13/908,587, filed on Jun. 3, 2013, now Pat. No. 8,925,657, which is a continuation of application No. 11/691,903, filed on Mar. 27, 2007, now Pat. No. 8,453,768, which is a continuation of application No. 10/617,598, filed on Jul. 11, 2003, now Pat. No. 7,210,544.

(60) Provisional application No. 60/395,589, filed on Jul. 12, 2002.

(51) Int. Cl.
*B60G 17/019* (2006.01)
*B62D 51/02* (2006.01)
*B62K 11/00* (2006.01)
*B60L 15/20* (2006.01)
*B60G 11/14* (2006.01)
*B60K 26/02* (2006.01)

(52) U.S. Cl.
CPC ............ *B60L 15/20* (2013.01); *B62D 51/002* (2013.01); *B62D 51/02* (2013.01); *B62K 11/00* (2013.01); *B62K 11/007* (2016.11); *B60G 2400/05* (2013.01); *B60G 2400/82* (2013.01); *Y02T 10/7258* (2013.01)

(58) Field of Classification Search
USPC .................................... 180/7.1, 6.48, 220
See application file for complete search history.

(56) References Cited

U.S. PATENT DOCUMENTS

| | | |
|---|---|---|
| 2,415,056 A | 1/1947 | Wheeler |
| 2,618,447 A | 11/1952 | Lecarme |
| 3,017,199 A | 1/1962 | Sechrist |
| 3,313,365 A | 4/1967 | Jackson |
| 3,338,328 A | 8/1967 | Cataldo |
| 3,628,624 A | 12/1971 | Wesener |
| 3,718,342 A | 2/1973 | Freed |
| 3,787,066 A | 1/1974 | Hautier |
| 3,790,150 A | 2/1974 | Lippert |
| 3,965,402 A | 6/1976 | Mogle |
| 3,993,154 A | 11/1976 | Simmons et al. |
| 4,065,145 A | 12/1977 | Chambers |
| 4,065,146 A | 12/1977 | Denzer |
| 4,078,627 A | 3/1978 | Brown et al. |
| 4,087,107 A | 5/1978 | Winchell |
| 4,111,445 A | 9/1978 | Haibeck |
| 4,140,200 A | 2/1979 | Tucek |
| 4,274,503 A | 6/1981 | Mackintosh |
| 4,281,734 A | 8/1981 | Johnston |
| 4,307,788 A | 12/1981 | Shelton |
| 4,413,693 A | 11/1983 | Derby |
| 4,484,648 A | 11/1984 | Jephcott |
| 4,556,997 A | 12/1985 | Takamiya et al. |
| 4,657,271 A | 4/1987 | Salmon |
| 4,657,272 A | 4/1987 | Davenport |
| 4,712,806 A | 12/1987 | Patrin |
| 4,716,980 A | 1/1988 | Butler |
| 4,732,353 A | 3/1988 | Studer |
| 4,750,578 A | 6/1988 | Brandenfels |
| 4,778,133 A | 10/1988 | Sakurai |
| 4,794,730 A | 1/1989 | Fischbach |
| 4,837,694 A | 6/1989 | Narita et al. |
| 4,897,070 A | 1/1990 | Wagstaff |
| 4,913,252 A | 4/1990 | Bartley et al. |
| 4,944,360 A | 7/1990 | Sturges |
| 4,967,862 A | 11/1990 | Pong et al. |
| 4,973,071 A | 11/1990 | Ishizaki |
| 4,984,754 A | 1/1991 | Yarrington |
| 5,001,636 A | 3/1991 | Shiraishi et al. |
| RE33,675 E | 8/1991 | Young |
| 5,088,761 A | 2/1992 | Takehara et al. |
| 5,098,041 A | 3/1992 | Uetrecht |
| 5,124,938 A | 6/1992 | Algrain |
| 5,125,468 A | 6/1992 | Coker |
| 5,186,270 A | 2/1993 | West |
| 5,199,297 A | 4/1993 | Lin et al. |
| 5,208,521 A | 5/1993 | Aoyama |
| 5,217,246 A | 6/1993 | Williams et al. |
| 5,221,883 A | 6/1993 | Takenaka et al. |
| 5,261,503 A | 11/1993 | Yasui |
| 5,274,576 A | 12/1993 | Williams |
| 5,276,624 A | 1/1994 | Ito et al. |
| 5,297,646 A | 3/1994 | Yamamura et al. |
| 5,307,888 A | 5/1994 | Urvoy |
| 5,307,892 A | 5/1994 | Phillips |
| 5,369,580 A | 11/1994 | Monji et al. |
| 5,376,868 A | 12/1994 | Toyoda et al. |
| 5,388,658 A | 2/1995 | Ando et al. |
| 5,397,890 A | 3/1995 | Schueler et al. |
| 5,408,411 A | 4/1995 | Nakamura et al. |
| 5,417,298 A | 5/1995 | Shibahata |
| 5,450,919 A | 9/1995 | Shitani |
| 5,465,806 A | 11/1995 | Higasa et al. |
| 5,482,125 A | 1/1996 | Pagett |
| 5,576,959 A | 11/1996 | Hrovat et al. |
| 5,646,845 A | 7/1997 | Gudat et al. |
| 5,649,605 A | 7/1997 | Ronne et al. |
| 5,657,828 A | 8/1997 | Nagamachi |
| 5,695,021 A | 12/1997 | Schaffner et al. |
| 5,701,965 A | 12/1997 | Kamen et al. |
| 5,705,746 A | 1/1998 | Trost et al. |
| 5,732,379 A | 3/1998 | Eckert et al. |
| 5,743,347 A | 4/1998 | Gingerich |
| 5,746,282 A | 5/1998 | Fujiwara et al. |
| 5,769,441 A | 6/1998 | Namngani |
| 5,774,819 A | 6/1998 | Yamamoto et al. |
| 5,791,425 A | 8/1998 | Kamen et al. |
| 5,794,730 A | 8/1998 | Kamen |
| 5,799,745 A | 9/1998 | Fukatani |
| 5,826,209 A | 10/1998 | Matsuno |
| 5,848,660 A | 12/1998 | McGreen |
| 5,850,136 A | 12/1998 | Kaneko |
| 5,869,943 A | 2/1999 | Nakashima et al. |
| 5,869,946 A | 2/1999 | Carobolante |
| 5,893,896 A | 4/1999 | Imamura et al. |
| 5,927,414 A | 7/1999 | Kan et al. |
| 5,928,309 A | 7/1999 | Korver et al. |
| 5,931,421 A | 8/1999 | Surauer et al. |
| 5,939,864 A | 8/1999 | Lenhart et al. |
| 5,957,410 A | 9/1999 | Bruederle et al. |
| 5,965,991 A | 10/1999 | Koike et al. |
| 5,971,091 A | 10/1999 | Kamen et al. |
| 5,973,463 A | 10/1999 | Okuda et al. |
| 5,975,225 A | 11/1999 | Kamen et al. |
| 6,002,975 A | 12/1999 | Schiffmann et al. |
| 6,003,624 A | 12/1999 | Jorgensen et al. |
| 6,024,182 A | 2/2000 | Hamada et al. |
| 6,050,357 A | 4/2000 | Staelin et al. |
| 6,052,647 A | 4/2000 | Parkinson et al. |
| 6,059,062 A | 5/2000 | Staelin et al. |
| 6,062,600 A | 5/2000 | Kamen et al. |
| 6,076,033 A | 6/2000 | Hamada et al. |
| 6,089,680 A | 7/2000 | Yoshioka et al. |
| 6,105,704 A | 8/2000 | Hamada et al. |
| 6,123,398 A | 9/2000 | Arai et al. |
| 6,125,953 A | 10/2000 | Arai et al. |
| 6,169,946 B1 | 1/2001 | Griessbach |
| 6,189,643 B1 | 2/2001 | Takahashi et al. |
| 6,192,305 B1 | 2/2001 | Schiffmann |
| 6,208,929 B1 | 3/2001 | Matsuno et al. |
| 6,223,104 B1 | 4/2001 | Kamen et al. |
| 6,247,548 B1 | 6/2001 | Hayashi et al. |
| 6,260,646 B1 | 7/2001 | Fernandez et al. |
| 6,263,261 B1 | 7/2001 | Brown et al. |
| 6,273,212 B1 | 8/2001 | Husted et al. |
| 6,276,471 B1 | 8/2001 | Kratzenberg et al. |
| 6,288,505 B1 | 9/2001 | Heinzmann et al. |
| 6,292,722 B1 | 9/2001 | Holmes et al. |
| 6,302,230 B1 | 10/2001 | Kamen et al. |
| 6,320,336 B1 | 11/2001 | Eguchi |

(56) References Cited

U.S. PATENT DOCUMENTS

| | | |
|---|---|---|
| 6,324,446 B1 | 11/2001 | Brown et al. |
| 6,325,736 B1 | 12/2001 | Hamada et al. |
| 6,328,125 B1 | 12/2001 | Van Den Brink et al. |
| 6,332,103 B1 | 12/2001 | Steenson, Jr. et al. |
| 6,332,104 B1 | 12/2001 | Brown et al. |
| 6,356,188 B1 | 3/2002 | Meyers et al. |
| 6,357,544 B1 | 3/2002 | Kamen et al. |
| 6,360,996 B1 | 3/2002 | Bockman et al. |
| 6,367,817 B1 | 4/2002 | Kamen et al. |
| 6,371,228 B1 | 4/2002 | Husted et al. |
| 6,387,007 B1 | 5/2002 | Fini, Jr. et al. |
| 6,388,580 B1 | 5/2002 | Graham |
| 6,415,215 B1 | 7/2002 | Nishizaki et al. |
| 6,435,535 B1 | 8/2002 | Field et al. |
| 6,435,538 B2 | 8/2002 | Ellis et al. |
| 6,463,369 B2 | 10/2002 | Sadano et al. |
| 6,502,011 B2 | 12/2002 | Haag |
| 6,543,564 B1 * | 4/2003 | Kamen .............. A61G 5/04 180/327 |
| 6,556,909 B2 | 4/2003 | Matsumoto et al. |
| 6,561,294 B1 | 5/2003 | Kamen et al. |
| 6,562,511 B2 | 5/2003 | Daroux et al. |
| 6,571,176 B1 | 5/2003 | Shinmura et al. |
| 6,571,892 B2 | 6/2003 | Kamen et al. |
| 6,581,714 B1 | 6/2003 | Kamen et al. |
| 6,586,901 B1 | 7/2003 | Singer et al. |
| 6,593,849 B2 | 7/2003 | Chubb et al. |
| 6,614,343 B1 | 9/2003 | Fennel et al. |
| 6,643,451 B1 | 11/2003 | Tokura et al. |
| 6,659,211 B2 | 12/2003 | Esposito |
| 6,659,570 B2 | 12/2003 | Nakamura |
| 6,694,225 B2 | 2/2004 | Aga et al. |
| 6,704,622 B2 | 3/2004 | Tinskey et al. |
| 6,752,231 B2 | 6/2004 | Hume |
| 6,781,960 B1 | 8/2004 | Charas |
| 6,789,640 B1 | 9/2004 | Arling et al. |
| 6,796,396 B2 | 9/2004 | Kamen et al. |
| 6,866,107 B2 | 3/2005 | Heinzmann et al. |
| 6,889,784 B2 | 5/2005 | Troll |
| 7,006,901 B2 | 2/2006 | Wang |
| 7,017,686 B2 | 3/2006 | Kamen et al. |
| 7,178,611 B2 | 2/2007 | Zupanick |
| 7,178,614 B2 | 2/2007 | Ishii |
| 7,198,223 B2 | 4/2007 | Phelps, III et al. |
| 7,210,544 B2 | 5/2007 | Kamen et al. |
| D551,592 S | 9/2007 | Chang et al. |
| D551,722 S | 9/2007 | Chang et al. |
| 7,275,607 B2 | 10/2007 | Kamen et al. |
| 7,303,032 B2 | 12/2007 | Kahlert et al. |
| 7,363,993 B2 | 4/2008 | Ishii |
| 7,481,291 B2 | 1/2009 | Nishikawa |
| 7,589,643 B2 | 9/2009 | Dagci et al. |
| D601,922 S | 10/2009 | Imai et al. |
| 7,688,191 B2 | 3/2010 | Lu et al. |
| 7,703,568 B2 | 4/2010 | Ishii |
| 7,857,088 B2 | 12/2010 | Field et al. |
| 7,958,956 B2 | 6/2011 | Kakinuma et al. |
| 8,014,923 B2 | 9/2011 | Ishii et al. |
| 8,028,777 B2 | 10/2011 | Kakinuma et al. |
| 8,074,388 B2 | 12/2011 | Trainer |
| 8,091,672 B2 | 1/2012 | Gutsch et al. |
| 8,162,089 B2 | 4/2012 | Shaw |
| 8,170,780 B2 | 5/2012 | Field et al. |
| 8,225,891 B2 | 7/2012 | Takenaka et al. |
| 8,285,474 B2 | 10/2012 | Doi |
| 8,417,404 B2 | 4/2013 | Yen et al. |
| 8,467,941 B2 | 6/2013 | Field et al. |
| 8,490,723 B2 | 7/2013 | Heinzmann et al. |
| 8,584,782 B2 | 11/2013 | Chen |
| 8,639,416 B2 | 1/2014 | Jones et al. |
| 8,640,807 B2 | 2/2014 | Takenaka |
| 8,684,123 B2 | 4/2014 | Chen |
| 8,738,238 B2 | 5/2014 | Rekow |
| 8,738,278 B2 | 5/2014 | Chen |
| 8,807,250 B2 | 8/2014 | Chen |
| 8,830,048 B2 | 9/2014 | Kamen et al. |
| 8,978,791 B2 | 3/2015 | Ha et al. |
| 9,045,190 B2 | 6/2015 | Chen |
| 9,126,497 B2 | 9/2015 | Heinzmann et al. |
| 9,156,516 B2 | 10/2015 | Kahlert et al. |
| 2002/0007239 A1 | 1/2002 | Matsumoto et al. |
| 2002/0056582 A1 | 5/2002 | Chubb et al. |
| 2002/0082749 A1 | 6/2002 | Meyers et al. |
| 2002/0121572 A1 | 9/2002 | Jacobson |
| 2003/0014167 A1 | 1/2003 | Pedersen et al. |
| 2003/0226698 A1 | 12/2003 | Kamen et al. |
| 2004/0005958 A1 | 1/2004 | Kamen et al. |
| 2004/0007644 A1 | 1/2004 | Phelps, III et al. |
| 2004/0069543 A1 | 4/2004 | Kamen et al. |
| 2004/0135434 A1 | 7/2004 | Honda |
| 2004/0201271 A1 | 10/2004 | Kakinuma et al. |
| 2004/0262871 A1 | 12/2004 | Schreuder et al. |
| 2005/0029023 A1 | 2/2005 | Takami et al. |
| 2005/0121866 A1 | 6/2005 | Kamen et al. |
| 2005/0236208 A1 | 10/2005 | Runkles et al. |
| 2006/0108956 A1 | 5/2006 | Clark et al. |
| 2006/0202439 A1 | 9/2006 | Kahlert et al. |
| 2006/0231313 A1 | 10/2006 | Ishii |
| 2007/0001830 A1 | 1/2007 | Dagci et al. |
| 2007/0296170 A1 | 12/2007 | Field et al. |
| 2008/0029985 A1 | 2/2008 | Chen |
| 2008/0147281 A1 | 6/2008 | Ishii et al. |
| 2008/0174415 A1 | 7/2008 | Tanida et al. |
| 2008/0197599 A1 | 8/2008 | Comstock et al. |
| 2008/0238005 A1 | 10/2008 | James |
| 2009/0032323 A1 | 2/2009 | Kakinuma et al. |
| 2009/0078485 A1 | 3/2009 | Gutsch et al. |
| 2009/0105908 A1 | 4/2009 | Casey et al. |
| 2009/0115149 A1 | 5/2009 | Wallis et al. |
| 2009/0224524 A1 | 9/2009 | Rathsack |
| 2010/0025139 A1 | 2/2010 | Kosaka et al. |
| 2010/0114468 A1 | 5/2010 | Field et al. |
| 2010/0121538 A1 | 5/2010 | Ishii et al. |
| 2010/0222994 A1 | 9/2010 | Field et al. |
| 2010/0237645 A1 | 9/2010 | Trainer |
| 2010/0250040 A1 | 9/2010 | Yamano |
| 2011/0209929 A1 | 9/2011 | Heinzmann et al. |
| 2011/0220427 A1 | 9/2011 | Chen |
| 2011/0221160 A1 | 9/2011 | Shaw |
| 2011/0238247 A1 | 9/2011 | Yen et al. |
| 2012/0197470 A1 | 8/2012 | Inui |
| 2012/0205176 A1 | 8/2012 | Ha et al. |
| 2012/0239284 A1 | 9/2012 | Field et al. |
| 2012/0290162 A1 | 11/2012 | Stevens et al. |
| 2013/0032422 A1 | 2/2013 | Chen |
| 2013/0032423 A1 | 2/2013 | Chen |
| 2013/0105239 A1 | 5/2013 | Fung |
| 2013/0228385 A1 | 9/2013 | Chen |
| 2013/0253769 A1 | 9/2013 | Kamo et al. |
| 2014/0058600 A1 | 2/2014 | Hoffmann et al. |

FOREIGN PATENT DOCUMENTS

| | | |
|---|---|---|
| CN | 101056680 A | 10/2007 |
| CN | 104071275 B | 3/2016 |
| DE | 3103961 A1 | 9/1982 |
| DE | 102 09 093 A1 | 9/2003 |
| EP | 1 791 609 B1 | 11/2011 |
| GB | 2 388 579 A | 11/2003 |
| HK | 1114353 | 10/2008 |
| JP | 09-010375 A | 1/1997 |
| JP | 9-248320 A | 9/1997 |
| JP | 10-023613 | 1/1998 |
| JP | 11-47196 A | 2/1999 |
| JP | 2000-70308 A | 3/2000 |
| JP | 2005022631 A | 1/2005 |
| JP | D1314974 S | 11/2007 |
| JP | D1323922 S | 3/2008 |
| JP | 4572594 B2 | 11/2010 |
| JP | 2011-246124 A | 12/2011 |
| JP | 5243795 B2 | 7/2013 |
| JP | 2014-218247 A | 11/2014 |
| TW | D124942 | 9/2008 |
| TW | D124943 | 9/2008 |

(56) References Cited

FOREIGN PATENT DOCUMENTS

| WO | 2003/068342 A1 | 8/2003 |
|---|---|---|
| WO | 2004/007264 A1 | 1/2004 |
| WO | 2006/042302 A1 | 4/2006 |
| WO | 2009/052471 A2 | 4/2009 |

OTHER PUBLICATIONS

Japanese Office Action for corresponding JP Appln. No. 2015-134807 dated Mar. 3, 2017.
International Search Report for Application No. PCT/US2017/019214 dated Jul. 25, 2017.
Cooper, Rory A., "Intelligent Control of Power Wheelchairs," IEEE Engineering in Medicine and Biology Magazine, IEEE Service Center, Piscataway, NJ, US vol. 14, No. 4, Jul. 1, 1995, pp. 423-431, XP011084628.
Elnagar, Ashraf, "Prediction of Moving Objects in Dynamic Environments Using Kalman Filters," Proceedings of 2001 IEEE International Symposium on Computational Intelligence in Robotics and Automation, Jul. 29-Aug. 1, 2001.
Grasser et al., "A Mobile, Inverted Pendulum," IEEE Transactions on Industrial Electronics, vol. 49, No. 1, Feb. 2002.
Ha, et al., "Trajectory Tracking Control for Navigation of the Inverse Pendulum Type Self-Contained Mobile Robot" 17 Robotics and Autonomous Systems 60-85 (1996).
Ha, et al. "Trajectory Tracking Control for Navigation of Self-Contained Mobile Inverse Pendulum" Intelligent Robots and Systems '94. Advanced Robotic Systems and the Real World, IROS '94. Proceedings of the IEEE/RSJ/GI International Conference on Intelligent Robots and Systems, vol. 3, pp. 1875-1882, Sep. 12-16, 1994.
Johnson, R.C,. "Unicycles and bifurcations," American J. of Physics, vol. 66, No. 7, 589-92 (1998).
Sheng et al., "Postural Stability of a Human Riding a Unicycle and Its Emulation by a Robot," IEEE Transactions on Robotics and Automation, Oct. 1997.
Sheng, et al., "Realization of a Human Riding a Unicycle by a Robot," Proceedings of the 1995 IEEE International Conference on Robotics and Automation, vol. 2, pp. 1319-1326 (1995).
Tanaka et al., "A Mobile Robot for Service Use: Behaviour Simulation System and Intelligent Control," Proceedings of the 1997 IEEE/RSJ International Conference on Intelligent Robots and Systems, 1997.
Ulyanov et al., "Fuzzy Intelligent Emotion and Instinct Control of a Robotic Unicycle," Proceedings of the 1996 4th International Workshop on Advanced Motion Control, 1996.
Ulyanov et al., "Soft computing for the intelligent robust control of a robotic unicycle with a new physical measure for mechanical controllability," Soft Computing vol. 2, issue 2, pp. 73-88 (1998).
Brown, Jr. et al,, "A Single-Wheel Gyroscopically Stabilized Robot," IEEE Robotics & Automation Magazine, Sep. 1997.
Lam et al., "Fuzzy Model Reference Control of Wheeled Mobile Robots," The 27th Annual Conference of the IEEE Industrial Electronics Society, 2001.
Liu et al., "Accelerometer for Mobile Robot Positioning," IEEE Transactions on Industry Applications, vol. 37, No. 3, May 2001.
Welch et al., "An Introduction to the Kalman Filter," Department of Computer Science University of North Carolina at Chapel Hill, 2004.
Zenkov et al., "The Lyapunov-Malkin Theorem and Stabilization of the Unicycle with Rider," Systems and Control Letters, vol. 45, Nos. 4, 5, pp. 293-302(10), Apr. 2002.
Zenkov, et al., "Matching and Stabilization of Low-Dimensional Nonholonomic Systems," Proc. CDC, 39, 1289-1295 (2000).
1003624-556174, Updated Joint Claim Construction Chart, In the Matter of Certain Personal Transporters, Components thereof, and Manuals Therefor, ITC investigation # 337-TA-935, Apr. 8, 2015.
1033211-565539, Order # 28, Initial Determination Grating Summary Determination on Violation of Section 337 and Recommended Determination on Remedy and Bonding, In the Matter of Certain Personal Transporters, Components thereof, and Manuals Therefor, ITC investigation # 337-TA-935, Aug. 21, 2015.
1079827-576064, Cease and Desist Order, In the Matter of Certain Personal Transporters, Components thereof, and Manuals Therefor, ITC investigation # 337-TA-935, Mar. 10, 2016.
1079830-576073, Limited Exclusion Order, In the Matter of Certain Personal Transporters, Components thereof, and Manuals Therefor, ITC investigation # 337-TA-935, Mar. 11, 2016.
1079831-576074, General Exclusion Order, In the Matter of Certain Personal Transporters, Components thereof, and Manuals Therefor, ITC investigation # 337-TA-935, Mar. 11, 2016.
1080137-576231, Exclusion Order in Certain Personal Transporters, Components, Thereof and Manuals Therefor, In the Matter of Certain Personal Transporters, Components thereof, and Manuals Therefor, ITC investigation # 337-TA-935, Mar. 14, 2016.
1093315-579120, [International Trade]Commission Opinion, In the Matter of Certain Personal Transporters, Components thereof, and Manuals Therefor, ITC investigation # 337-TA-935, Apr. 20, 2016.
996185-553835, Joint Claim Construction Chart, In the Matter of Certain Personal Transporters, Components thereof, and Manuals Therefor, ITC investigation # 337-TA-935, Mar. 24, 2015.
996297-553895, [International Trade] Commission Investigative Staff's Initial Markman Brief, In the Matter of Certain Personal Transporters, Components thereof, and Manuals Therefor, ITC investigation # 337-TA-935, Mar. 25, 2015.
998936-554701, [International Trade] Commission Investigative Staff's Rebuttal Markman Brief, In the Matter of Certain Personal Transporters, Components thereof, and Manuals Therefor, ITC investigation # 337-TA-935, Apr. 8, 2015.
553955, Corrected Version of Complainants Segway et al. Initial Markman Brief, including Appendices A-E, In the Matter of Certain Personal Transporters, Components thereof, and Manuals Therefor, ITC investigation # 337-TA-935, Mar. 26, 2015.
979544-548562 Respondent Roboscooters Response to the Amended Complaint and Notice of Investigation and Exhibit B, In the Matter of Certain Personal Transporters, Components thereof, and Manuals Therefor, ITC investigation # 337-TA-935, Dec. 13, 2014.
Segway Inc. and DEKA Products Limited Partnership's Responses to Respondent Shenzhen Inmotion Technologies Co., Ltd.'s Second Set of Interrogatories (Nos. 59-61) including Appendices A-1 through A-3, B-1 through B-3, and C, In the Matter of Certain Personal Transporters, Components thereof, and Manuals Therefor, ITC investigation # 337-TA-935, Apr. 23, 2015.
Exhibit B to Respondent Shenzhen Inmotion Technologies Co., Ltd.'s Response to the Amended Complaint and Notice of Investigation, In the Matter of Certain Personal Transporters, Components thereof, and Manuals Therefor, ITC investigation # 337-TA-935, Dec. 8, 2014 (Note: this should be attached to 975358-547493 which is where the date comes from).
Respondent Shenzhen Inmotion Technologies Co., Ltd., Second Supplemental Objections and Responses to Complainants Segway Inc. and DEKA Products Limited Partnership's First Set of Interrogatories (Nos. 1-33) [Nos. 25, 28-30] and First Supplemental Responses to Complainants' Second Set of Interrogatories (Nos. 34-40) (No. 38), In the Matter of Certain Personal Transporters, Components thereof, and Manuals Therefor, ITC investigation # 337-TA-935, May 1, 2015.
Official Action from corresponding Japanese Application No. 2011-1977538 dated Apr. 26, 2016.
553898, Complainants Segway, inc., and DEKA Products Limited Partnership's Initial Markman Brief, including Appendices A-E, In the Matter of Certain Personal Transporters, Components thereof, and Manuals Therefor, ITC investigation # 337-TA-935, Mar. 25, 2015.
554773, Complainants Segway, inc., and DEKA Products Limited Partnership's Initial Markman Brief, including Exhibits F-Q, In the Matter of Certain Personal Transporters, Components thereof, and Manuals Therefor, ITC investigation # 337-TA-935, Apr. 8, 2015.
1003624-556174, Updated Joint Claim Construction, In the Matter of Certain Personal Transporters, Components thereof, and Manuals Therefor, ITC investigation # 337-TA-935, Apr. 30, 2015.

(56) References Cited

OTHER PUBLICATIONS

Respondent Robstep Robot Co., Ltd.'s Initial Invalidity Contentions and Invalidity Charts A-1 through A-4, B-1 through B-4, C-1 through C-4, In the Matter of Certain Personal Transporters, Components thereof, and Manuals Therefor, ITC investigation # 337-TA-935, Feb. 20, 2015.
Respondent Robstep Robot Co., Ltd.'s Initial Notice of Prior Art, In the Matter of Certain Personal Transporters, Components thereof, and Manuals Therefor, ITC investigation # 337-TA-935, Feb. 20, 2015.
547826 Respondent Robstep Robot Co., Ltd.'s Response to Amended Complaint, In the Matter of Certain Personal Transporters, Components thereof, and Manuals Therefor, ITC investigation # 337-TA-935, Dec. 12, 2014.
555660 Respondent Shenzhen Inmotion Technologies Co., Ltd.'s Second Notice of Prior Art, In the Matter of Certain Personal Transporters, Components thereof, and Manuals Therefor, ITC investigation # 337-TA-935, Apr. 22, 2015.
855843-543527, Complainants Segway Inc. and DEKA Products Limited Partnership Amended Complaint, In the Matter of Certain Personal Transporters, Components thereof, and Manuals Therefor, ITC investigation # 337-TA-935, Oct. 6, 2014.
975358-547493, Respondent Shenzhen Inmotion Technologies Co., Ltd.'s Response to the Amended Complaint and Notice of Investigation, In the Matter of Certain Personal Transporters, Components thereof, and Manuals Therefor, ITC investigation # 337-TA-935, Dec. 8, 2014.
976632-548144, Respondents Ninebot Inc. et al. Response to the Amended Complaint and Notice of Investigation, including Exhibits A and B, In the Matter of Certain Personal Transporters, Components thereof, and Manuals Therefor, ITC investigation # 337-TA-935, Dec. 19, 2014.

\* cited by examiner

CONTROL OF A TRANSPORTER BASED ON ATTITUDE

CROSS REFERENCE TO RELATED APPLICATIONS

This application is a divisional of U.S. application Ser. No. 14/589,116 filed Jan. 5, 2015, which is a continuation of U.S. application Ser. No. 13/908,587 filed Jun. 3, 2013, which is a continuation of U.S. application Ser. No. 11/691,903 filed Mar. 27, 2007, which is a continuation of U.S. application Ser. No. 10/617,598, filed Jul. 11, 2003, which claims priority from U.S. provisional patent application Ser. No. 60/395,589, filed Jul. 12, 2002, each of which is hereby incorporated by reference herein in its entirety.

TECHNICAL FIELD

The present invention pertains to transporters and methods for transporting a load, which may be a living subject, and more particularly to controlling motion of a transporter.

BACKGROUND ART

A wide range of vehicles having a motorized drive arrangement are known for conveying various subjects, either for purposive locomotion or for recreational purposes.

The means used to command the motorized drive arrangement of these vehicles varies greatly. For example, an operator may manipulate an accelerator pedal to control forward motion of an automobile, while steering is typically performed using a steering wheel. Or the motion of a sporting vehicle may be controlled by rocking a foot board upon which a user is balanced towards the front or rear to mechanically move a throttle cable, as described in U.S. Pat. No. 4,790,548 (Francken). Based on the operator's physical attributes for example, or the transporter's intended functionality, alternative methods for controlling motion of a transporter may be desirable.

SUMMARY OF THE INVENTION

In a first embodiment of the invention there is provided a transporter for transporting a load over a surface. The transporter includes a support platform for supporting the load. The support platform is characterized by a fore-aft axis, a lateral axis, and an orientation with respect to the surface, the orientation referred to as an attitude. At least one ground-contacting element, which is driven by a motorized drive arrangement, is coupled to the support platform in such a manner that the attitude of the support platform is capable of variation. A sensor module generates a signal characterizing the attitude of the support platform. Based on the attitude, a controller commands the motorized drive arrangement.

In accordance with related embodiments of the invention, one or more ground-contacting elements may be flexibly coupled to the support platform in such a manner that the attitude of the support platform is capable of variation based on a position of a center of mass of the load relative to the at least one ground-contacting element. The sensor module may include at least one distance sensor for measuring a distance characteristic of the attitude of the platform. The distance sensor may be selected from the group of distance sensors consisting of an ultrasonic distance sensor, an acoustic distance sensor, a radar distance sensor, optical distance sensor, and a contact sensor, such as a whisker(s). The at least one distance sensor may sense the distance between a fiducial point on the platform and a position on the surface disposed at a specified angle with respect to the support platform. In other embodiments, the transporter may include a first component that remains in a substantially fixed vertical position relative to the surface, wherein the at least one distance sensor senses the distance between a fiducial point on the platform and the first component. One or more ground contacting elements may include a wheel having an axle, and the first component is fixed relative to the axle. Alternatively, and not meant to be limiting, one or more ground contacting elements may include a wheel supported by a frame, and the first component is fixed relative to the frame.

In accordance with other related embodiments of the invention, the attitude of the support platform is capable of variation based at least on a signal generated by a remote control device. The transporter may include a powered strut coupled to the platform, the powered strut capable of varying the attitude of the support platform based at least on the signal generated by the remote control device. The transporter may further include a user interface, wherein the attitude of the support platform is capable of variation based on a signal generated by the user interface. The controller may command motion of the transporter in the fore-aft plane and/or the lateral plane.

In accordance with another embodiment of the invention, a method for controlling a transporter having a support platform for supporting a load is presented. The support platform is characterized by an attitude with respect to the surface. The transporter includes at least one ground contacting elements flexibly coupled to the support platform in such a manner that the attitude of the platform is capable of variation. The transporter also includes a motorized drive arrangement for driving the at least one ground contacting elements. The method includes generating a signal characterizing an attitude of the support platform. The motorized drive arrangement is commanded based at least on the attitude.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
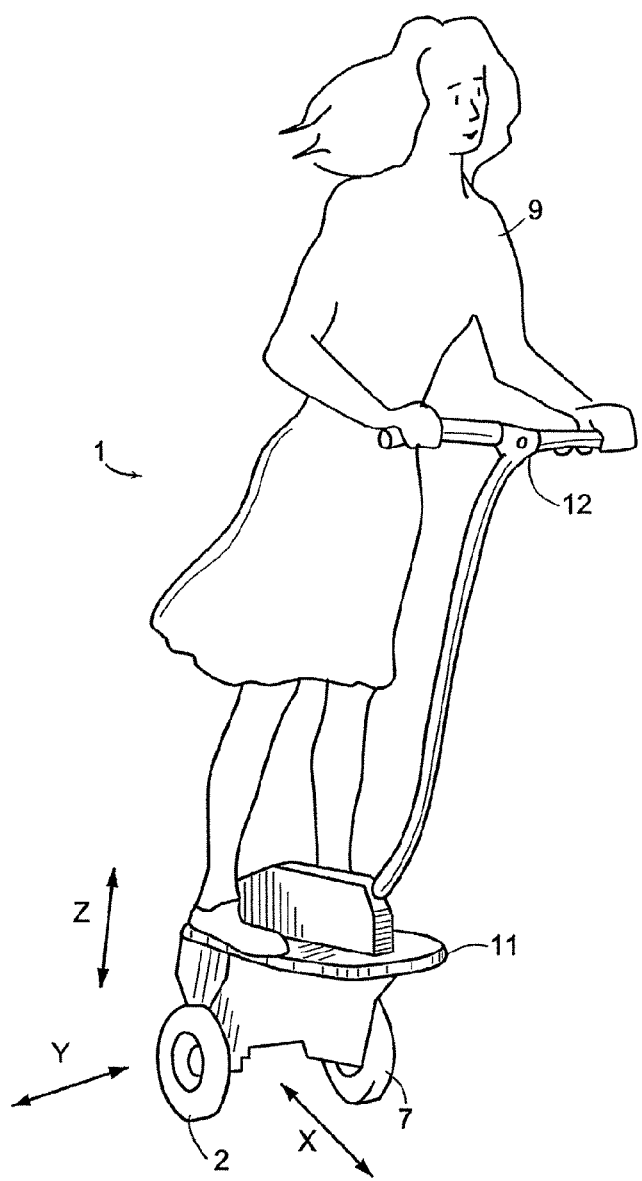
FIG. 1 depicts one embodiment of a human transporter, lacking a distinct user input device, to which the present invention may advantageously be applied.

In accordance with one embodiment of the invention, FIG. 1 shows a transporter, 1 lacking a distinct input device, to which the present invention may advantageously be applied. Transporter 1 is described in detail in U.S. Pat. No. 6,302,230, which is incorporated herein by reference in its entirety. Transporter 1 includes a support platform 11 for supporting a load, which may be a living subject 9, over the ground or other surface, such as a floor, which may be referred to herein generally as "ground". A subject, for example, may stand or sit on support platform 11. Attached to support platform 11 may be a handlebar 12 that can be gripped when riding transporter 1.

One or more ground-contacting elements 2, 7 provide contact between support platform 11 and the ground. Ground-contacting elements 2, 7 may include, but are not limited to, arcuate members, tracks, treads, and wheels (hereinafter the term "wheel" will be used in the specification to refer to any such ground-contacting element without limitation). While the transporter 1 depicted in FIG. 1 lacks stability in its operating position unless subject to controlled balancing, the application of the present invention is specifically not limited to transporters of that sort and embodiments of the present invention may advantageously be applied to statically stable transporters as well.

Support platform 11 may be flexibly coupled to the wheels 2, 7 by various means known in the art, for example, a pivot mechanism, springs, or pneumatic pistons. In other embodiments, the wheels 2, 7 may have some compliance and serve the function of a spring. For purposes of the present description, platform 11 may be characterized by a fore-aft axis, a lateral axis, and an orientation with respect to the surface, which is referred to herein as an attitude. The fore-aft axis, X-X, is perpendicular to the wheel axis, while the lateral axis, Y-Y, is parallel to the axis of the wheels. Directions parallel to the axes X-X and Y-Y are called the fore-aft and lateral directions respectively.

Figure 2:
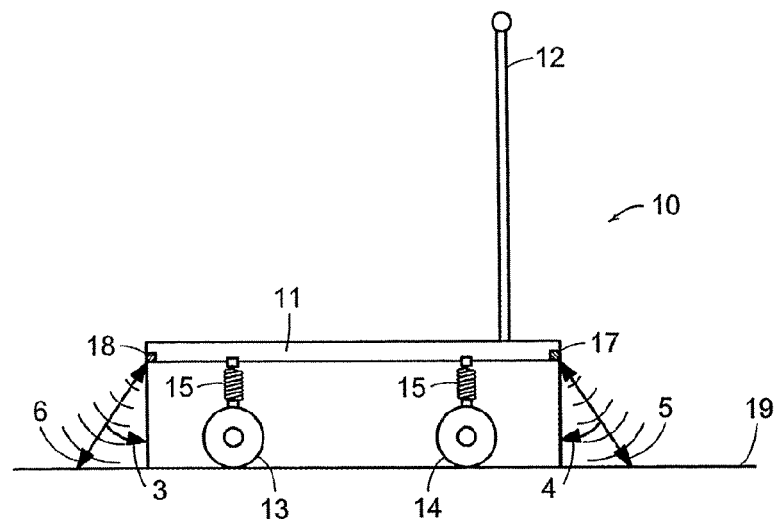
FIG. 2 is a side view of a transporter, in accordance with one embodiment of the invention.

Referring now to FIG. 2, which shows a transporter 10 in accordance with one embodiment of the invention, the attitude of support platform 11 may, for example, be capable of variation based on a position of a center of mass of the load relative to one or more wheels 13, 14. Alternatively, transporter 10 may include a power strut or other mechanism capable of altering the attitude of the support platform 11. The power strut may be controlled by a user interface located on transporter 10, such as a joystick or a rotatable potentiometer located on handlebar 12. In other embodiments, the power strut may also be controlled by a remote control device, such as, but not limited to, an infrared or radio controlled remote control device.

The motion of transporter 10 is based, at least in part, on the attitude of the support platform 11. To determine the attitude of the support platform 11, transporter 10 includes a sensor module. Sensor module may include at least one distance sensor 17, 18 for measuring a distance characteristic of the attitude of the support platform 11. The distance measured may be, for example, the distance between a fiducial point on the support platform 11 and a surface 19, or alternatively, another component on transporter 10. A plurality of distances measured by the sensor module may be combined to generate at least one signal characteristic of the platform attitude.

Attitude/distance sensor may be one of many sensor types, such as, for example, an ultrasonic, optical, acoustic or radar sensor wherein a signal generated by a source is reflected back by a surface to a sensor receiver. The distance from the sensor to the surface can then be calculated based on the time (or phase) difference between when the signal was generated and when the reflected signal was received. Triangulation may be performed. In other embodiments, distance sensor can be a contact sensor(s) such as, without limitation, a whisker(s). For example, a plurality of whiskers, each having a predetermined length may be utilized, with distance determined based on which whisker bends or is otherwise activated when making contact with the surface. A single whisker may be utilized with distance determined based, at least on part, on the bending angle of the whisker.

Referring to FIG. 2, distance sensors 17, 18 sense the distance between a fiducial point on the platform and a position on the surface that is disposed at a specified angle 3, 4, with respect to the support platform. First distance sensor 17 is located at the front (fore) of platform 11 and senses a first distance 5 between platform 11 and surface 19.

Second distance sensor 17 is located at the back (aft) of platform 11 and senses a second distance 6 between platform 11 and surface 19. By comparing distances 5 and 6, a signal indicative of an attitude of the platform 11, and more specifically, the inclination of the platform 11 in the fore-aft plane with respect to the surface 19, can be determined.

Figure 3:
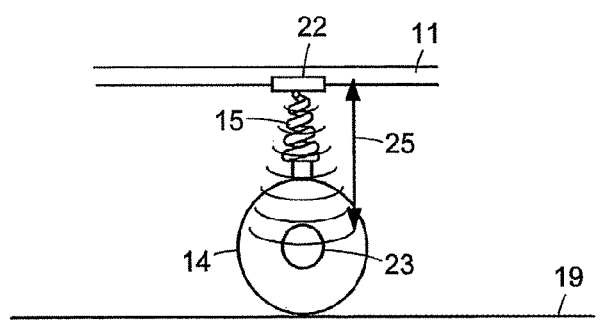
FIG. 3 is an expanded side view of a transporter, in accordance with one embodiment of the invention.

In another embodiment, at least one distance sensor 22 may sense the distance between a fiducial point on the transporter platform 11 and a first component 23 that remains in a substantially fixed vertical position relative to the surface 19, as shown in the expanded view of a transporter in FIG. 3. First component 23 may be, for example, a wheel axle 23 or a frame used to support the at least one wheel 14. In various embodiments, first component 23 may include a reflector for reflecting the signal generated by distance sensor 22.

Figure 4:
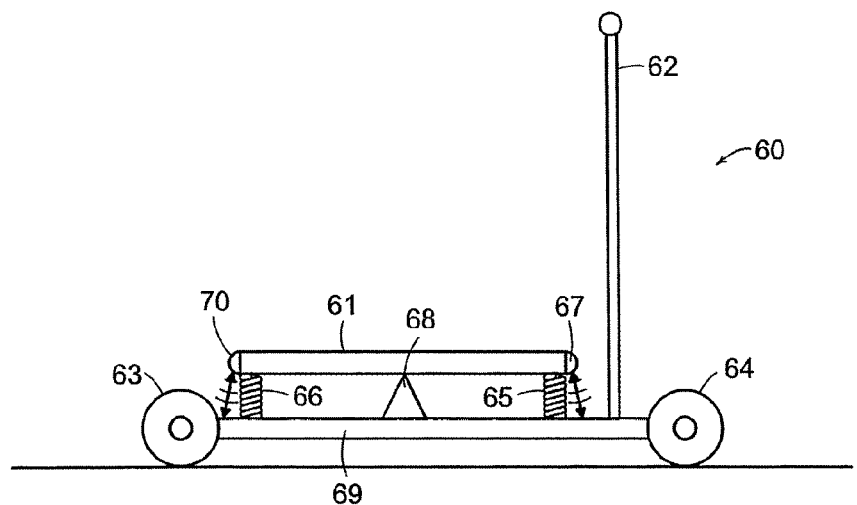
FIG. 4 is a side view of a transporter, in accordance with one embodiment of the invention.

FIG. 4 shows a transporter 60 that includes a first support platform 69 and a second support platform 61, in accordance with one embodiment of the invention. At least one wheel 63 and 64 provides contact between the first support platform 69 and the ground. Second support platform 61 is coupled to the first support platform 69 such that the second support platform 61 can tilt in the fore-aft plane based, for example, on a position of a center of mass of the loaded second support platform 61. Second support platform 61 may be tiltably attached to the first support platform 69 using, without limitation, springs 65 and 66 and/or a pivot mechanism 68. Similar to above-described embodiments, based on the tilting of the second support platform 61, at least one sensor 67 and 70 generates a signal indicative of the attitude of the second support platform 61. Attached to the first support platform 69 or second support platform 61 may be a handlebar 62 that can be gripped while operating the transporter 60.

A controller receives the signal characteristic of the attitude from the sensor module. Based at least on this signal, the controller implements a control algorithm to command a motorized drive arrangement so as to drive the at least one wheel. The controller may also respond to commands from other operator interfaces, such as a joystick or dial attached, for example, to handlebar.

Figure 5:
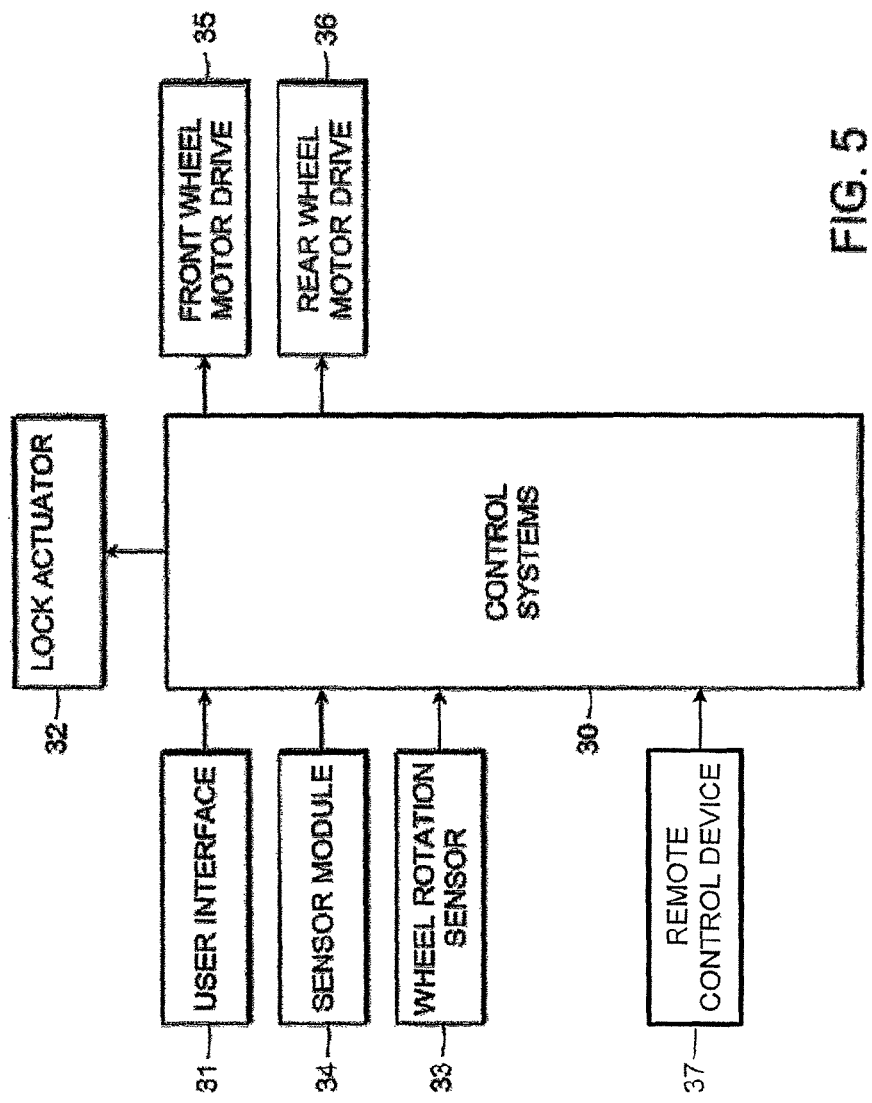
FIG. 5 is a block diagram of a controller of a transporter, in accordance with one embodiment of the invention.

FIG. 5 shows a controller 30 for controlling the motorized drive of the transporter, in accordance with one embodiment of the invention. Controller 30 receives an input characteristic of platform attitude from sensor module 34. Based at least on the input from the sensor module, controller 30 commands at least one motorized drive 35, 36. Controller 30 also interfaces with a user interface 31 and a wheel rotation sensor 33.

User interface 31 may include, among other things, controls for turning the controller 30 on or off. When the controller 30 is turned off, the at least one wheel of the transporter may be free to move, such that the transporter acts as a typical push scooter. User interface 31 may also control a locking mechanism 32 for locking the at least one wheel.

The controller 30 includes a control algorithm to determine the amount of torque to be applied to the at least one wheel based on the sensed attitude of the support platform. The control algorithm may be configured either in design of the system or in real time, on the basis of current operating mode and operating conditions as well as preferences of the user. Controller may implement the control algorithm by using a control loop. The operation of control loops is well known in the art of electromechanical engineering and is outlined, for example, in Fraser & Milne, Electro-Mechanical Engineering, IEEE Press (1994), particularly in Chapter 11, "Principles of Continuous Control" which is incorporated herein by reference.

As an example, and not meant to be limiting, the control algorithm may take the form:

$$\text{Torque Command to Wheel} = K[\theta + O]$$

where K=gain
θ=support platform attitude, and
O=offset.

The support platform attitude, θ, may be in the form of an error term defined as the desired support platform attitude minus the measured support platform attitude. The gain, K, may be a predetermined constant, or may be entered/adjusted by the operator through user interface 31. Responsiveness of the transporter to attitude changes can be governed by K. For example, if K is increased, a rider will perceive a stiffer response in that a small change in platform attitude will result in a large torque command. Offset, O, may be incorporated into the control algorithm to govern the torque applied to the motorized drive, either in addition to, or separate from, the direct effect of θ. Thus, for example, the user may provide an input by means of a user interface of any sort, the input being treated by the control system equivalently to a change, for example, in platform attitude.

Thus, referring back to FIG. 2, motion of the transporter 10 may be controlled by a subject changing the attitude of the platform 11. This change in attitude is reflected by distances 5, 6 sensed by the sensor module. Depending on the control algorithm, an initial change in attitude, such that first distance 5 is less than second distance 6, may result in positive torque being applied to one or more wheels 23, 24, causing the wheels 23, 24 to move forward. Likewise, an initial change in the attitude, such that first distance 5 is greater than second distance 6 may result in a negative torque applied to one or more wheels 23, 24, causing the wheels 23, 24 to move in the aft direction. If the subject then remains in his changed position on the platform such that the platform attitude remains the same, the motor will continue to torque at approximately the same rate.

In various embodiments of the invention, the sensor module may sense changes in platform attitude in addition to, or instead of inclination of support platform in the fore-aft plane. For example, sensor module may provide an attitude signal indicative of inclination of the support platform in the lateral plane relative to the surface. This may be accomplished by the use of two laterally disposed distance sensors. Changes in the angle of inclination of the support platform in the lateral plane can then be used either separately or in combination with other attitude changes to control motion of the transporter. For example, changes in the angle of inclination in the fore-aft plane can be used to control fore-aft motion, while changes in the angle of inclination in the lateral plane can be used to control steering of the transporter.

Steering may be accomplished in an embodiment having at least two laterally disposed wheels (i.e., a left and right wheel), by providing separate motors for left and right wheels. Torque desired for the left motor and the torque desired for the right motor can be calculated separately. Additionally, tracking both the left wheel motion and the right wheel motion permits adjustments to be made, as known to persons of ordinary skill in the control arts, to prevent unwanted turning of the vehicle and to account for performance variations between the two motors.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A transporter for transporting a load comprising:
   a plurality of support platforms, at least one of the plurality of support platforms being tiltable;
   at least one ground contacting element coupled to the transporter;
   a motorized drive arrangement driving the at least one ground contacting element; at
   least one sensor generating at least one sensor signal indicative of an attitude of at least one of the plurality of support platforms;
   a controller commanding the motorized drive to apply a torque to the at least one ground contacting element based at least on the attitude.

2. The transporter of claim 1, wherein at least one point on one of the plurality of support platforms comprises a displaceable point with respect to a frame used to support the at least one ground contacting element.

3. The transporter of claim 1, wherein at least one of the plurality of support platforms is tiltable based on a position of a center of mass of the load relative to the at least one ground contacting element.

4. The transporter of claim 1, wherein the controller further comprises determining an inclination in the fore-aft plane of one of the plurality of support platforms.

5. The transporter of claim 1 further comprising an axle, the axle including a parallel orientation to a lateral axis of the transporter, the at least one of the plurality of support platforms being tiltable, in a fore-aft plane of the transporter, with respect to the axle.

6. The transporter of claim 1, wherein the torque comprises positive and negative values based on changes detected by the at least one sensor signal.

7. A transporter comprising; a
   plurality of support platforms;
   at least one ground contacting element coupled to the plurality of support platforms;
   a motorized drive arrangement for driving the at least one ground contacting element;
   at least one sensor generating at least one sensor signal indicative of an attitude of at least one of the plurality of support platforms;
   a controller commanding the motorized drive arrangement to apply a torque to one or more of the at least one ground contacting elements based at least on the attitude.

8. The transporter of claim 7, wherein the at least one ground contacting element comprises a first ground contacting element and a second ground contacting element.

9. The transporter of claim 7, further comprising a pivot mechanism tiltably attaching one of the plurality of support platforms to another of the plurality of support platforms.

10. The transporter of claim 7, wherein at least one of the plurality of support platforms tilts in a fore-aft plane relative to at least a portion of the transporter.

11. The transporter of claim 10, wherein the fore-aft plane comprises an orientation perpendicular to an axis of the at least one ground contacting element.

12. The transporter of claim 7, wherein one of the plurality of support platforms tilts relative to another of the plurality of support platforms.

13. The transporter of claim 7, wherein the at least one sensor signal is based at least in part on a tilt difference between one of the plurality of support platforms and another of the plurality of support platforms.

14. The transporter of claim 8, wherein the at least one ground contacting element comprises a first ground contacting element and a second ground contacting element, the first ground contacting element and the second ground contacting element being laterally disposed.

15. The transporter of claim 14, wherein the motorized drive arrangement comprises a first motor driving the first ground contacting element and a second motor driving the second ground contacting element.

16. The transporter of claim 15, wherein the controller determines, based at least in part on the at least one sensor signal, a desired first torque for the first motor separately from a desired second torque for the second motor.

17. The transporter of claim 16, wherein the desired first torque and the desired second torque comprise positive and negative values based on changes detected by the at least one sensor signal.

18. The transporter of claim 8, wherein the first ground contacting element and the second ground contacting element comprise wheels, the wheels rotating about a first wheel axle and a second wheel axle, at least one of the at least one sensor signals indicating a location of a fiducial point on the transporter, the fiducial point being in relation to at least one of the first wheel axle and the second wheel axle.

* * * * *